July 16, 1957

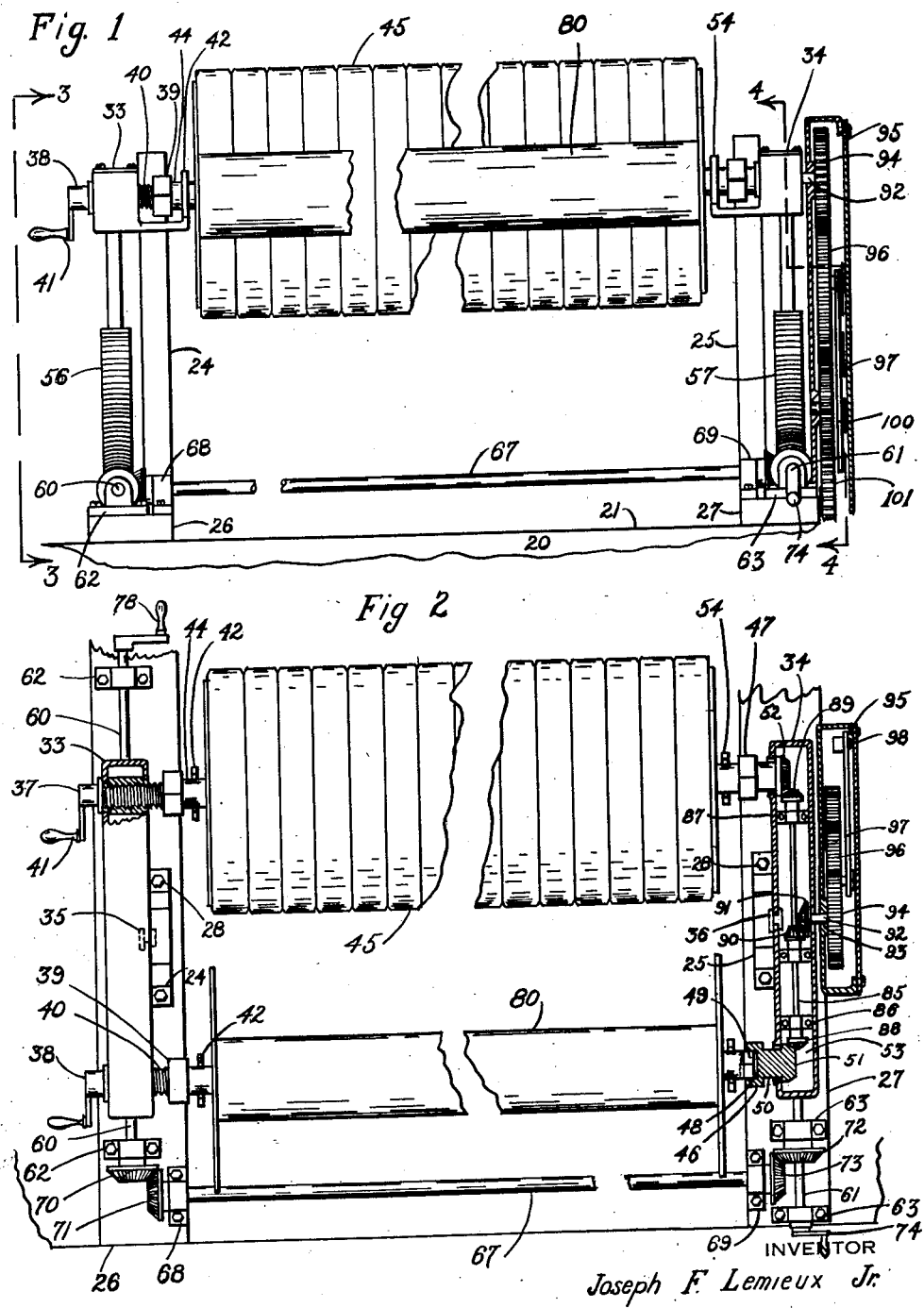

J. F. LEMIEUX, JR 2,799,131

TILTABLE ROPING SPOOL STAND

Filed Feb. 23, 1955

INVENTOR
Joseph F. Lemieux Jr.
BY
Pearson + Pearson
ATTORNEYS

United States Patent Office 2,799,131
Patented July 16, 1957

2,799,131

TILTABLE ROPING SPOOL STAND

Joseph F. Lemieux, Jr., Leominster, Mass.

Application February 23, 1955, Serial No. 489,940

13 Claims. (Cl. 57—54)

This invention relates to an improved method and machine for handling roping or roving spools used on textile spinning frames.

Such spinning frames are usually long and include a bank of bobbins or other yarn holders along each opposite side thereof, the strands being passed through drafting mechanism and then twisted as they are wound into packages on the holders. The strand supply is in the form of large spools, usually having opposite heads, a cylindrical body and either a continuous axial shaft or short end shafts or trunnions. A line of spools, each in a spool stand on top of the centre of the frame and each feeding a section of both sides of the frame is usually provided. The spool is wound with longitudinally spaced separate windings of a plurality of ropings each alternate roping feeding a bobbin on opposite sides of the frame, but all ropings being drawn off one side of the spool.

Heretofore the spool being unwound has been guided by its end shafts in vertical slots and has rested on a power driven drum whereby it has been slowly rotated in the direction of unwinding. The replacement of a spent spool anywhere along the frame has required stopping the entire frame while a new full spool is slid into the vertical guides and while the operator attaches each new supply of roping to a roping from the spent spool. The full spool is then at the top of the guides, in the longitudinal centre line of the frame requiring a difficult reach by the operator and the man hours lost in this transfer operation are very costly.

The principal object of this invention is to provide a machine and method whereby a spent spool may be replaced by a full spool without stopping the frame.

Another object of the invention is to provide means, independent of a spool revolving drum, for rotating a roping supply spool thereby eliminating the drum and providing space for lowering the spool to a more accessible height.

A further object of the invention is to provide a pair of continually rotating spool holders, capable of slowly revolving both a spent spool and a full spool while an operator attaches ropings from the full spool to the ropings of the spent spool.

Still another object of the invention is to provide a pair of tiltable cross arms having an unobstructed space therebetween together with means for tilting the cross arms in parallelism without interfering with the work space required for transferring ropings.

A still further object of the invention is to provide means for swinging a spool from its normal level to a lower level for spool substitution or for roping transfer purposes while still causing the spools to rotate in synchronization with the rest of the spinning frame.

Other objects and advantages of the invention will be apparent from the following description of the drawings, from the appended claims, and from the drawings wherein an embodiment thereof is illustrated.

In the drawings, Fig. 1 is an elevation from a longitudinally extending side of a spinning frame of the top portion thereof showing a spool stand in accordance with the invention.

Fig. 2 is a plan view of the device shown in Fig. 1.

Figure 4:
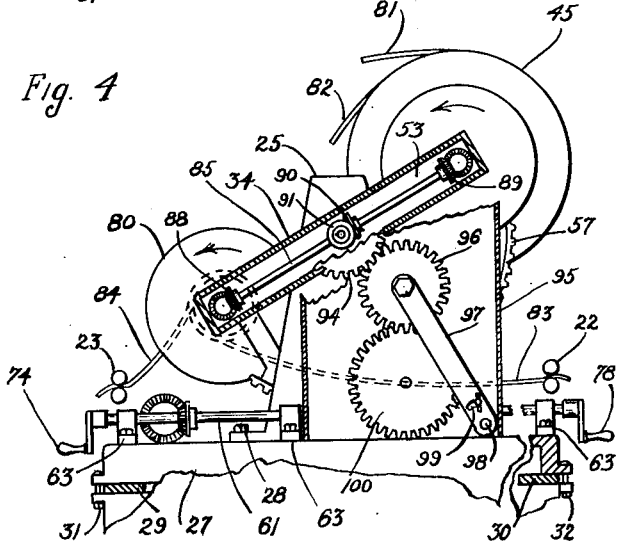
Fig. 4 is an end elevation of the device shown in Fig. 1 in section on the line 4—4 of Fig. 1.

In the drawings 20 represents a section of a textile spinning frame of a well known type, the section shown being the upper part of a single roping spool section. The upper platform 21 of the frame, called the top herein, includes two parallel sets of drafting rolls 22 and 23 spaced about six inches above the top 21, one set extending longitudinally near each side edge for the bobbins on that side as shown in Fig. 4. A spool drum for revolving a spool by friction usually extends longitudinally of each frame section 20 with its axis about on a level with the drafting rolls in ordinary frames but in this invention the single spool drum is eliminated entirely and is therefore not shown.

Each spool stand of this invention includes a pair of upstanding supporting posts 24 and 25, spaced apart longitudinally of the frame of a sufficient distance to accommodate a roping spool therebetween. Preferably each post is detachably mounted at its base to a laterally extending frame piece such as 26 or 27 by bolts 28 and the frame pieces are detachably mounted at each opposite end thereof to the Sampson rails 29 or 30 of the frame as by clamps 31 or 32.

A pair of spool supporting cross arms 33 and 34 are each centrally pivoted as at 35 or 36 to one of the posts 24 or 25, preferably on the outside thereof. Cross arm 33 includes a pair of identical clamp elements 37 and 38, one on each side of the cross arm near the terminal end and spaced apart sufficiently to accommodate a full roping spool in each clamp. Each clamp element such as 38 includes a freely rotatable socket 39 carried by a threaded thrust screw 40 having a crank 41 whereby it may be advanced and retracted axially. Preferably also, each clamp element such as 38 includes a stationary V shaped bracket such as 42 into which a trunnion such as 44 of a spool 45 may be dropped and supported while the socket 39 is advanced around the trunnion.

Cross arm 34 also includes a pair of identical clamp elements 46 and 47, one on each side of the cross arm near the terminal end and oppositely disposed to the corresponding clamp element 37 or 38. Each clamp element such as 47 includes a socket 48 of square interior cross section to slideably receive the squared shaft end or trunnion 49 of a roping spool such as 45. Each socket 48 is carried by a short shaft 50 journalled in the cross arm 34 and having a beveled gear such as 51 or 52 at its end within the drive compartment 53 of cross arm 34. Preferably the clamp elements 46 and 47 each include V shaped brackets such as 54, similar to brackets such as 42, to hold the trunnion of a spool 45 while it is being clamped or unclamped between the sockets.

The tilting means of the invention includes a pair of parti-circular spur gears of large diameter, 56 and 57 each depending from, and fixed to, a cross arm such as 33 or 34. A pair of worm gears such as 58 are provided, each enmeshed with a spur gear and each carried by a worm gear shaft 60 or 61. The worm gear shafts 60 and 61 extend laterally of the spinning frame and are mounted in suitable bearings such as 62 or 63 fixed to a frame piece such as 26 or 27. A longitudinally extending connecting shaft 67 is provided, mounted in suitable bearings 68 and 69 well outside the paths of the cross arms or roping spools carried by the cross arms, and preferably near a side edge of the top 21 of the spinning frame. Connecting shaft 67 is connected to worm gear shafts 60 and 61 by bevel gears 70, 71, 72 and 73 whereby the rotation of one worm gear causes a corresponding movement of the other worm gear and tilts the cross arms in parallelism. A crank 74, on shaft 61 is provided on one side of the frame to rotate the worm gears and a crank 78 on shaft 60 is provided on the opposite side of the frame for also rotating the worm gears as desired. It will be apparent that no central shaft is thus required along the pivot axis of the cross arms and that the space between two spools in the cross arms and the space below the same is unobstructed to permit an operator to piece, splice or otherwise attach ropings from one spool to those of the other spool.

Figure 3:
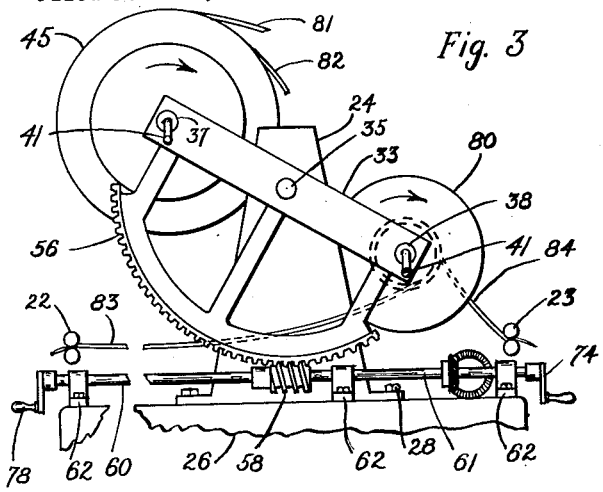
Fig. 3 is an end elevation of the device shown in Fig. 1 from the direction of the line 3—3 of Fig. 1.

As indicated in Figs. 1 and 2 the cross arms 33 and 34 are normally horizontal while a spool such as 80 is being slowly revolved and the ropings unwound therefrom. The cross arms may be tilted to lower the clamp elements 37 and 48 below the level of spool 80 while a new spool such as 45 is clamped therein. As indicated in Figs. 3 and 4 the nearly spent spool 80 may then be lowered below the level of the full spool 45 by tilting cross arms 33 and 34 thus enabling the operator to attach the new ropings such as 81 and 82 to the old ropings 83 and 84 in a free work space.

The driving means of the invention includes a rotatable shaft 85 extending axially and centrally lengthwise of the hollow drive compartment 53 of cross arm 34. Shaft 85 is suitably journalled in cross arm 34 as at 86 and 87 and carries a pair of end bevel gears 88 and 89 and an intermediate bevel gear 90. Bevel gear 88 is enmeshed with bevel gear 52 and bevel gear 89 is enmeshed with bevel gear 51 whereby rotation of bevel gear 90 causes the square sockets such as 48 of clamp elements 46 and 47 to also rotate. A bevel gear 91 is enmeshed with bevel gear 90 and carried by a shaft 92 journalled at 93 in cross arm 34 and carrying a spur gear 94 outside the cross arm 34. A gear box or gear frame 95 is mounted outside cross arm 34 and supported on frame piece 27 as shown, or on the frame 20. As best shown in Fig. 4, gear 94 is rotated by a gear 96 preferably journalled on an arm 97 pivoted at 98 at one end and oscillatable in a slot 99 at the other end whereby the drive connection may be broken when desired. Forming part of the gear train is another gear 100 normally enmeshed with gear 96 and also enmeshed with a gear 101, the gear 101 being part of the drive mechanism of the frame 20 normally used for revolving the spool drums. Regardless of the angle of tilt of the cross arms 33 and 34, it will be obvious that by reason of the gear drive through cross arm 34, the sockets such as 48 continuously revolve at the desired low speed, the power being transmitted through shaft 92 which is coaxial with the pivot axis 36 of the cross arm 34.

In operation, the roping spool stands of the invention which are usually four in number are installed in a longitudinally extending line along the top of a spinning frame preferably near one side or the other. The cross arms 33 and 34 are tilted while a full roping spool such as 80 is installed in each set of oppositely disposed clamp elements such as 37 and 46. Alternate ropings from spool 80 are fed to opposite sides of the frame, the cross arms are preferably tilted to become horizontal and the frame is put into operation.

When spool 80 is nearly spent, the cross arms are again tilted to lower the empty clamp elements 38 and 46 while raising spool 80 whereby a full spool 45 may be installed all without stopping the frame. The cross arms 33 and 34 are again tilted to raise full spool 45 and lower spent spool 80 while the operator pieces the ropings with both spools continuously and slowly revolving. Upon completion of the transfer, spool 80 is removed and a new spool substituted ready to commence the next cycle of the apparatus.

Figure 5:
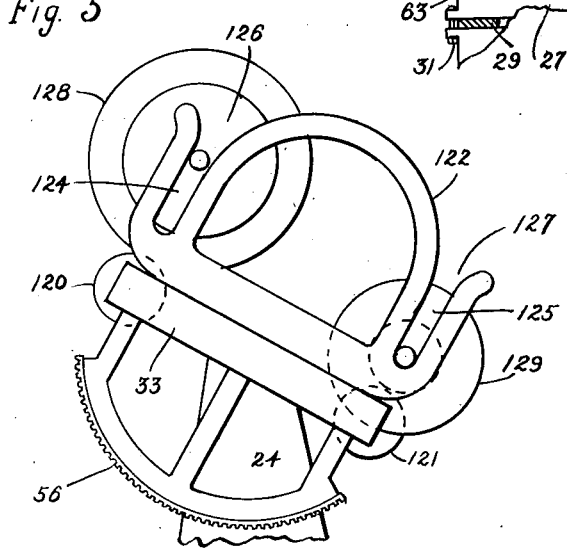
Fig. 5 is a fragmentary view similar to Fig. 3 of a modification.

While one of the advantages of the above described embodiment of the invention is the elimination of the single spool revolving drum now in use, it may be desirable to provide spool driving means in the form of a pair of such drums carried on the tiltable cross arms. As shown in Fig. 5 by substituting a pair of spool revolving drums 120 and 121 for the roping spools 45 and 80 and mounting a roping spool guide such as 122 on each cross arms such as 33 and 34 such a modification is achieved. Each guide such as 122 includes a pair of laterally spaced slots 124 and 125, each having a flared open end 126 or 127 and arranged to receive the shaft ends of roping spools such as 128 and 129. The roping spools 128 and 129 are thus rotatably supported in the slots of the guides and in circumferential rolling contact with the drums 120 and 121 whereby they are continually revolved at low speed regardless of the angle of tilt of the cross arms.

In the device illustrated in Figs. 1–4 the rate of rotation of the roping spool shafts is constant but the surface speed of the spools gradually increases as the roping is exhausted therefrom. Preferably the shaft speed is set to cause the surface speed of the spools to about equal the speed of the draft rolls near the exhaustion point of the spools. Thus the surface speed of a full spool is slightly slower than the speed of the drafting rolls and the roping is not only kept taut but initially may be slightly stretched. As the spool is exhausted, the tautness and attenuation diminish but not to the point of causing the roping strands to sag unduly.

Figure 6:
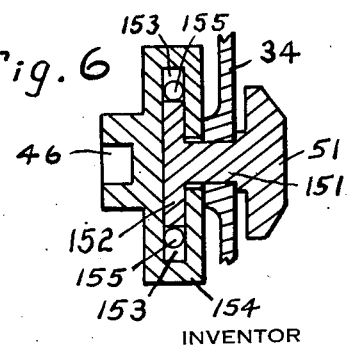
Fig. 6 is an enlarged fragmentary plan view, in half section, of an over running clutch between the spool driving mechanism and a spool clamp element.

If it is desired to avoid any possible stretching of the roping in the device of Figs. 1–4 an over running clutch such as 150, of any suitable well known type, may be installed between each bevel gear 51 or 52 and their respective clamp elements 46 and 47. The speed of bevel gears 51 and 52 may thus remain constant to continually revolve both roping spools on the stand, but the spool feeding the draft rolls may freely rotate in the direction of feeding under pull of the plurality of roping strands. A preferred type of over running clutch is shown in Fig. 6, wherein a bevel gear such as 51 is connected by a shaft 151 to a disc 152 having circumferential tapered slots such as 153. A clutch housing 154 encloses disc 152 and is rotatably mounted therearound. Housing 154 carries the clamp element 46 and a ball such as 155 is provided in each tapered slot 153 to permit over running of the clamp element 46.

I claim:

1. A roving spool stand for a textile spinning frame, said stand comprising a pair of upstanding supporting posts adapted to be mounted on top of the spinning frame at a spaced distance apart longitudinally thereof; a pair of spool supporting cross arms each centrally pivoted in one of said posts on an opposite side of an unobstructed space therebetween; oppositely disposed rotatable clamp elements at the opposite end of each cross arm for detachably receiving and rotating a spool in the space between said cross arms; tilting means, outside the space defined between the paths of said cross arms for tilting both of said arms in constant parallelism with each other, and driving means, including a driving connection on, and tiltable with, at least one said cross arm for rotating said rotatable clamp elements in synchronization with the drive of the spinning frame.

2. A spool stand as specified in claim 1 wherein the rotatable clamp elements on one cross arm each include a shaft socket mounted for rotation by said driving means, and the rotatable clamp elements on the other cross arm each include axially movable shaft sockets and threaded means for advancing and retracting the same.

3. A spool stand as specified in claim 1 wherein said tilting means includes a pair of parti-circular spur gears, each fixed to a cross arm and concentric with the axis thereof, a pair of worm gears, each supported adjacent the base of a post and enmeshed with a spur gear; a rotatable drive shaft extending longitudinally of said stand outside the space between said posts and arms for connecting said worm gears, and a hand crank for rotating said shaft and gears.

4. A spool stand as specified in claim 1 wherein said driving means includes a drive shaft rotatably mounted within and extending lengthwise of a cross arm; two end bevel gears and an intermediate bevel gear fixed to said drive shaft within said cross arm; a pair of bevel gears within said cross arm, each gear at right angles to an end bevel gear and operably connected to a clamp element to revolve the same; a bevel gear at right angles to the intermediate bevel gear on said shaft within said cross arm for rotating said shaft, and a train of gears outside said cross arm for connecting said last named bevel gear with the drive mechanism of the spinning frame.

5. A spool stand as specified in claim 1 wherein said driving means includes a drive connection on a cross arm for rotatably connecting the clamp elements on said arm with a rotatable shaft coaxial with the pivot of said arm and a drive connection outside said cross arm for rotatably connecting said rotatable shaft with the rotating drive mechanism of the spinning frame.

6. A spool stand as specified in claim 1 wherein said tilting means includes manually rotatable worm gears revoluble in equal amounts by a longitudinally extending connecting shaft, and said driving means includes a drive shaft within a cross arm rotatable from outside said cross arm.

7. In a spinning frame, at least one spool stand including a pair of upstanding posts mounted a spaced distance apart longitudinally and intermediate laterally of the top of said frame; a pair of cross arms, each independently pivoted to one of said posts centrally thereof; a pair of freely rotatable axially movable, spool shaft sockets on one cross arm; a pair of oppositely disposed axially fixed rotatable spool shaft sockets on the other cross arm; manually operable tilting means, outside the space between said posts and cross arms, for tilting said cross arms in parallelism, and mechanically operated driving means, synchronized with the drive mechanism of said spinning frame, for continuously revolving said axially fixed rotatable spool shaft sockets independently of the presence of a spool shaft therein.

8. A spinning frame as specified in claim 7 wherein said spool stand is positioned a spaced distance laterally from the longitudinal centre line of the frame for giving access thereto from a single side of said frame.

9. A spinning frame as specified in claim 7 wherein the driving means of said spool stand is connected to the shaft of the spool revolving drum of said frame.

10. A spinning frame as specified in claim 7 wherein the driving means of said spool stand includes a train of gears, journalled in an upstanding gear box supported on top of the spinning frame alongside a post; one gear of said train being journalled in an oscillatable mounting for movement toward and away from another gear of said train of gears.

11. In a spinning frame, a pair of cross arms each having means thereon for receiving and supporting two full roping spools with the spools extending longitudinally of the frame; means for pivotally mounting each cross arm, independently of the other, about a common axis above the spinning frame; tilting means associated with said frame for tilting both said cross arms in parallelism to lift one spool to a higher level than the other, and driving means, associated with one of said cross arms for continuously rotating both said spools in the same angular direction regardless of the angle of tilt of the cross arms and in synchronization with the drive mechanism of said frame.

12. A roving spool stand for a textile spinning frame, said stand comprising a pair of upstanding supporting posts adapted to be mounted on top of a spinning frame at a spaced distance apart longitudinally thereof; a pair of cross arms, each centrally pivoted on one of said posts; manually operable tilting mechanism on said stand for tilting said cross arms in parallelism; a pair of drums, each extending longitudinally across the space between said cross arms on an opposite side of said posts and each rotatably supported at the ends of said cross arms; roping spool guide means on said cross arms for receiving and guiding a pair of roping spools into circumferential rolling contact with said drums, and drive means on said stand connecting with the drive of said frame for continuously rotating said drums while supported in said tiltable cross arms.

13. A roving spool stand for a textile spinning frame, said stand comprising a pair of upstanding supporting posts adapted to be mounted on top of a spinning frame at a spaced distance apart longitudinally thereof; a pair of cross arms, each centrally pivoted on one of said posts; manually operable tilting mechanism on said stand for tilting said cross arms in parallelism; means associated with each opposite side of each of said cross arms for rotatably supporting one of a pair of roping spools therebetween; a pair of drums each rotatably mounted between said arms, on an opposite side thereof, and in engagement with the roping of the adjacent spool, and means, tiltable with said cross arms, for rotating the pair of drums carried thereby.

References Cited in the file of this patent

UNITED STATES PATENTS

| 830,296 | Butler | Sept. 4, 1906 |
| 1,716,812 | Ball | June 11, 1929 |
| 2,045,059 | Tomlin | June 23, 1936 |
| 2,332,005 | Nystrom et al. | Oct. 19, 1943 |
| 2,703,681 | Jacobs | Mar. 8, 1955 |

FOREIGN PATENTS

| 309,626 | Great Britain | Apr. 15, 1929 |